United States Patent
Herzog et al.

(10) Patent No.: US 6,631,757 B2
(45) Date of Patent: Oct. 14, 2003

(54) COMBINED HEAT EXCHANGER AND REACTOR COMPONENT

(75) Inventors: Jacques Herzog, Roethenbach i. Allgaeu (FR); Marcel Corneille, Stuttgart (DE); Michael Klier, Beuren (DE); Christoph Koch, Kirchheim (DE); Bernd Schoenrock, Owen/Teck (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 137 days.

(21) Appl. No.: 09/922,914

(22) Filed: Aug. 7, 2001

(65) Prior Publication Data

US 2002/0033251 A1 Mar. 21, 2002

(30) Foreign Application Priority Data

Aug. 8, 2000 (DE) .......................... 100 38 523

(51) Int. Cl.$^7$ ................................. F28F 3/08
(52) U.S. Cl. ........................ 165/167; 165/DIG. 357; 422/198
(58) Field of Search ................ 165/125, 166, 165/165, 167, DIG. 357, 138; 422/202, 198, 129; 122/18.1, 367.1

(56) References Cited

U.S. PATENT DOCUMENTS

| 1,914,077 | A | * | 6/1933 | Cluchey ................. 165/99 |
| 2,251,066 | A | * | 7/1941 | Persson et al. ........... 165/167 |
| 2,368,732 | A | * | 2/1945 | Wallgren ................ 165/125 |
| 2,370,309 | A | * | 2/1945 | Hartwig ................. 165/162 |
| 3,241,598 | A | * | 3/1966 | Falkenblad et al. ....... 159/28.6 |
| 3,704,748 | A | * | 12/1972 | Hapgood ................ 165/165 |
| 3,785,435 | A | * | 1/1974 | Stein et al. ............. 165/76 |
| 4,382,425 | A | * | 5/1983 | Boyes ................. 122/367.1 |
| 4,535,840 | A | * | 8/1985 | Rosman et al. .......... 165/167 |
| 6,361,747 | B1 | * | 3/2002 | Dion et al. .............. 422/128 |

FOREIGN PATENT DOCUMENTS

| DE | 4313861 | | 11/1994 | |
| DE | 19754185 | | 2/1999 | |
| JP | 63-233293 | A * | 9/1988 | ........ F28D/9/00 |

* cited by examiner

Primary Examiner—Allen Flanigan
(74) Attorney, Agent, or Firm—Crowell & Moring LLP

(57) ABSTRACT

A combined component consists of a heat exchanger and a reactor. The heat exchanger is designed in a plate form, and flow spaces for a first medium and a second medium are alternately defined between successive plates. The plates of the heat exchanger are configured as essentially annular. The heat exchanger has, substantially perpendicularly to the plates, a tubular outer wall and a tubular inner wall. The reactor is surrounded by the inner wall of the heat exchanger. The product of the reactor is conducted through supply orifices on the inner wall of the heat exchanger into the flow spaces for one of the two fluids in the heat exchanger.

9 Claims, 4 Drawing Sheets

COMBINED HEAT EXCHANGER AND REACTOR COMPONENT

BACKGROUND AND SUMMARY OF THE INVENTION

The present invention relates to a combined component consisting of a heat exchanger and of a reactor, in which the heat exchanger has a plate form and the flow spaces for first and second media are present alternatively between successive plates.

Known heat exchangers, are used, for example, as evaporators, and are always supplied as separate components. Complicated structures in terms of space requirement and weight are therefore necessary in order to connect the heat exchanger, for example, to a reactor which generates the product to be treated. As a result, the space requirement and the total weight of the individual components are relatively high. This has proven to be a disadvantage particularly for mobile applications, e.g., in the motor vehicle sector.

SUMMARY OF THE INVENTION

An object of the present invention is to provide an arrangement of a combination consisting of heat exchanger and of reactor, this combination being as uncomplicated as possible and saving costs, weight and space.

The object has now been achieved by way of a combined component consisting of heat exchanger and of reactor the plates of the heat exchanger have a substantially annular configuration, and the heat exchanger has, substantially perpendicularly to the plates, a tubular outer wall and a tubular inner wall, the reactor is surrounded by the inner wall of the heat exchanger, whereby a product of the reactor is conductable through supply orifices on the inner wall of the heat exchanger into the flow spaces for one of the two media in the heat exchanger.

According to the present invention, the heat exchanger and the reactor are combined in one component. The plates of the heat exchanger are essentially annularly. At the same time, the heat exchanger has, essentially perpendicularly to the annular plates, a tubular outer wall and a tubular inner wall.

The tubular inner wall in one currently preferred embodiment surrounds the reactor. Inflow orifices are provided on the inner wall of the heat exchanger. Product from the reactor is conducted through the inflow orifice into the flow spaces of the heat exchanger.

In one contemplated embodiment of the present invention, the outer wall of the heat exchanger can have orifices for discharging the reactor product conducted through the heat exchanger. In this embodiment, the reactor product conducted through the heat exchanger can advantageously be intercepted by a housing which surrounds the heat exchanger. This housing can be used, for example, to collect and subsequently discharged the product of the reactor.

The supply orifices for the product on the inner wall and the discharge orifices on the outer wall of the heat exchanger can advantageously be arranged adjacently to one another, but on different sides of a relief slot arranged in the annular plates. By virtue of this arrangement of the supply and discharge orifices, the product completes about one revolution when it runs through the heat exchanger. The advantage of the relief slots is that thermomechanical stresses in the component is reduced.

Inflow and outflow lines for the second medium flowing through the heat exchanger can likewise be arranged adjacently to one another, perpendicularly to the plates of the heat exchanger. The relief slot in the plates separates the two lines from one another, so that the second medium completes about one revolution when it runs through the heat exchanger.

The second medium used can, for example, be a heat transfer medium or a medium to be cooled in order to control the temperature of the reactor product.

Sealing webs are arrangable on both sides of the relief slots, with the result that the flow spaces are closed off relative to the slots.

In a further contemplated embodiment of the present invention, the outer wall of the heat exchanger has a protuberance. This protuberance can serve as an outflow line for the reactor product. Thus, in this further embodiment, a housing surrounding the heat exchanger can be eliminated.

The protuberance of the outflow line and the supply lines for the reactor product can be located diametrically opposite one another. The product of the reactor can thus complete about half a revolution when it runs through the heat exchanger.

The inflow and the outflow lines for the second medium can be located diametrically opposite one another, so that the second medium completes about half a revolution when it runs through the heat exchanger.

In particular, a further inflow line for a third medium can be arranged in the flow spaces of the heat exchanger. This inflow line for the third medium communicates with a flow space for one of the two fluids. This third medium can, for example, be additionally evaporated or admixed in the respective flow space. Separate flow spaces can, however, also be provided for the third medium.

In a particularly advantageous embodiment of the present invention, the reactor can be replaced by a fan or a filter. The construction described and the fluid routing in the heat exchanger will not change as a result.

According to the present invention, the heat exchanger can be configured, for example, as an evaporator, in which the reactor product discharges its heat, in the respective flow spaces of the heat exchanger, to the medium which is to be evaporated. It is also contemplated, however, to use the heat exchanger as a cooler, with the reactor product being cooled in the respective flow spaces. In another version, the reactor product can be used for controlling the temperature of the second medium flowing in from outside.

Furthermore, the heat exchanger in the combined component can likewise be constructed additionally as a reactor. A catalyst material is then located within the flow spaces of the product. The reactor can, for example, be a catalytic burner of a fuel-cell system, into which burner the anode and cathode exhaust gases of the fuel-cell system are introduced in order, for example, to burn the residual hydrogen contained in the exhaust gas.

Such a combined component according to the present invention can be used in fuel-cell systems, in particular in mobile applications.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE PREFERRED DRAWINGS

Figure 1:
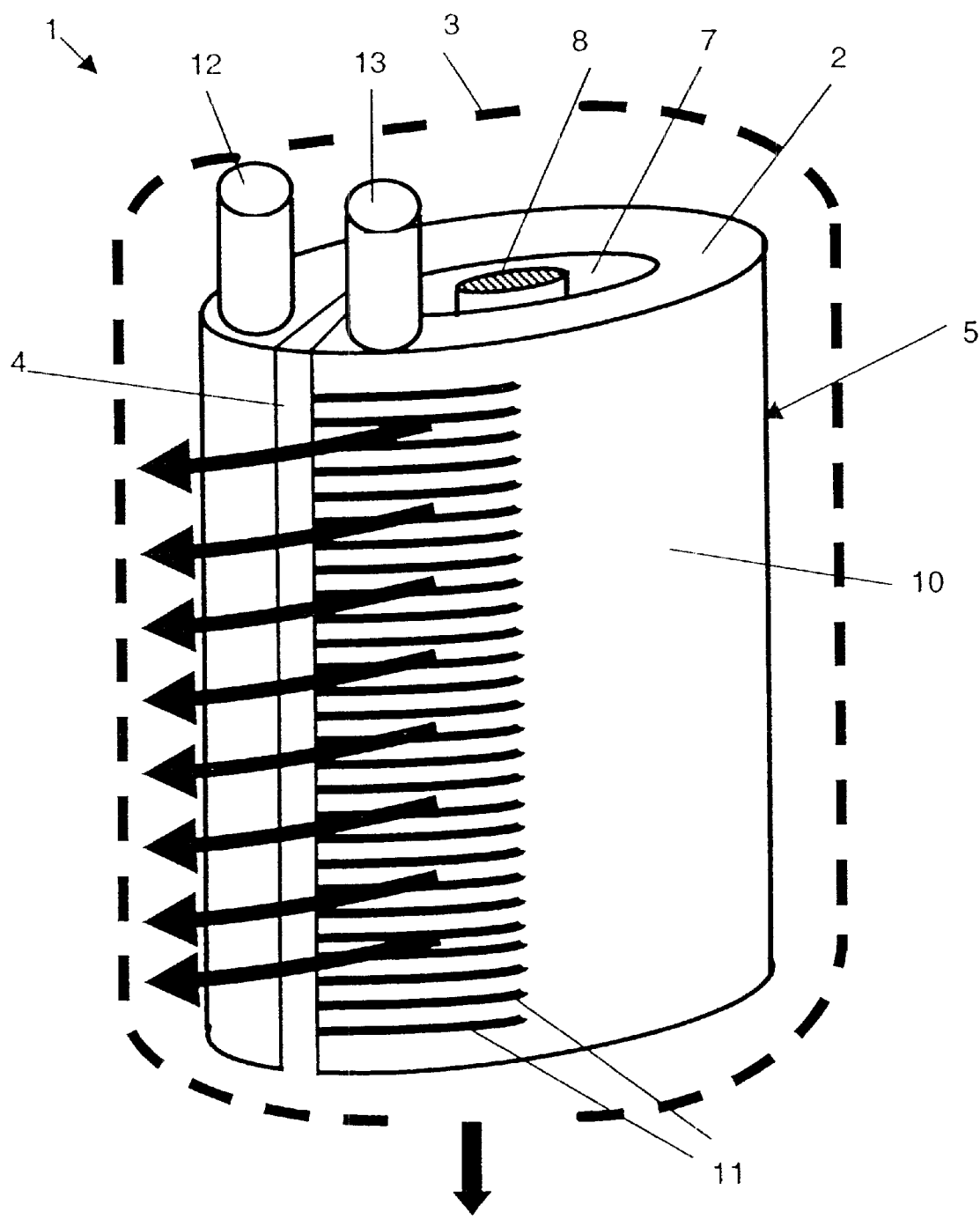
FIG. 1 is a schematic perspective view of the construction of a first embodiment of a combined component with housing according to the present invention.
Figure 2:
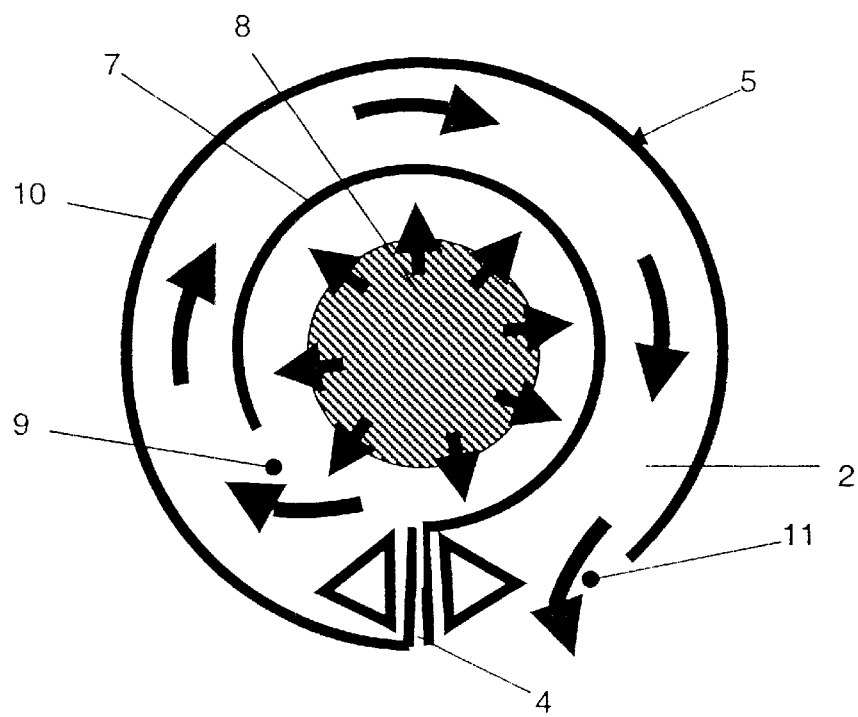
FIG. 2 is a schematic showing the flow routing within the heat exchanger of FIG. 1 for the reactor product.
Figure 3:
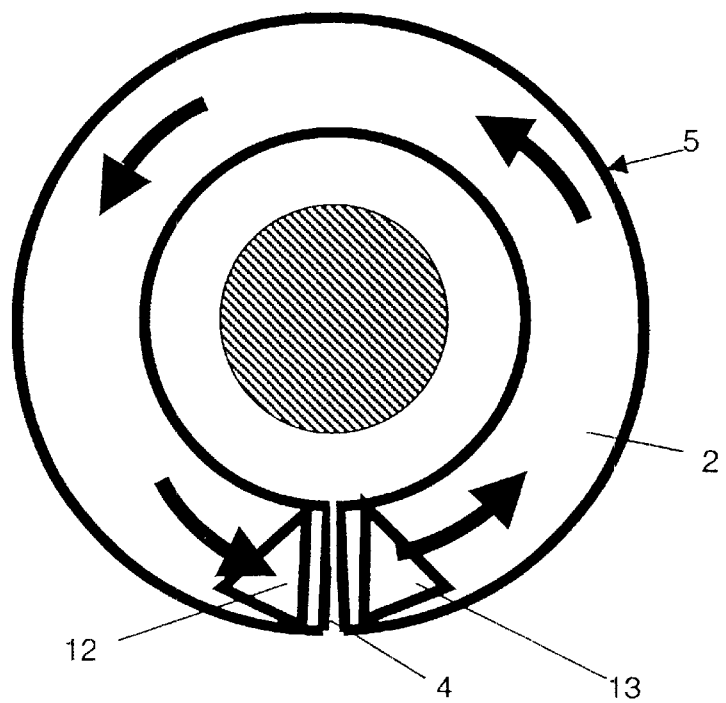
FIG. 3 is a schematic showing the flow routing within the heat exchanger for the second medium.
Figure 4:
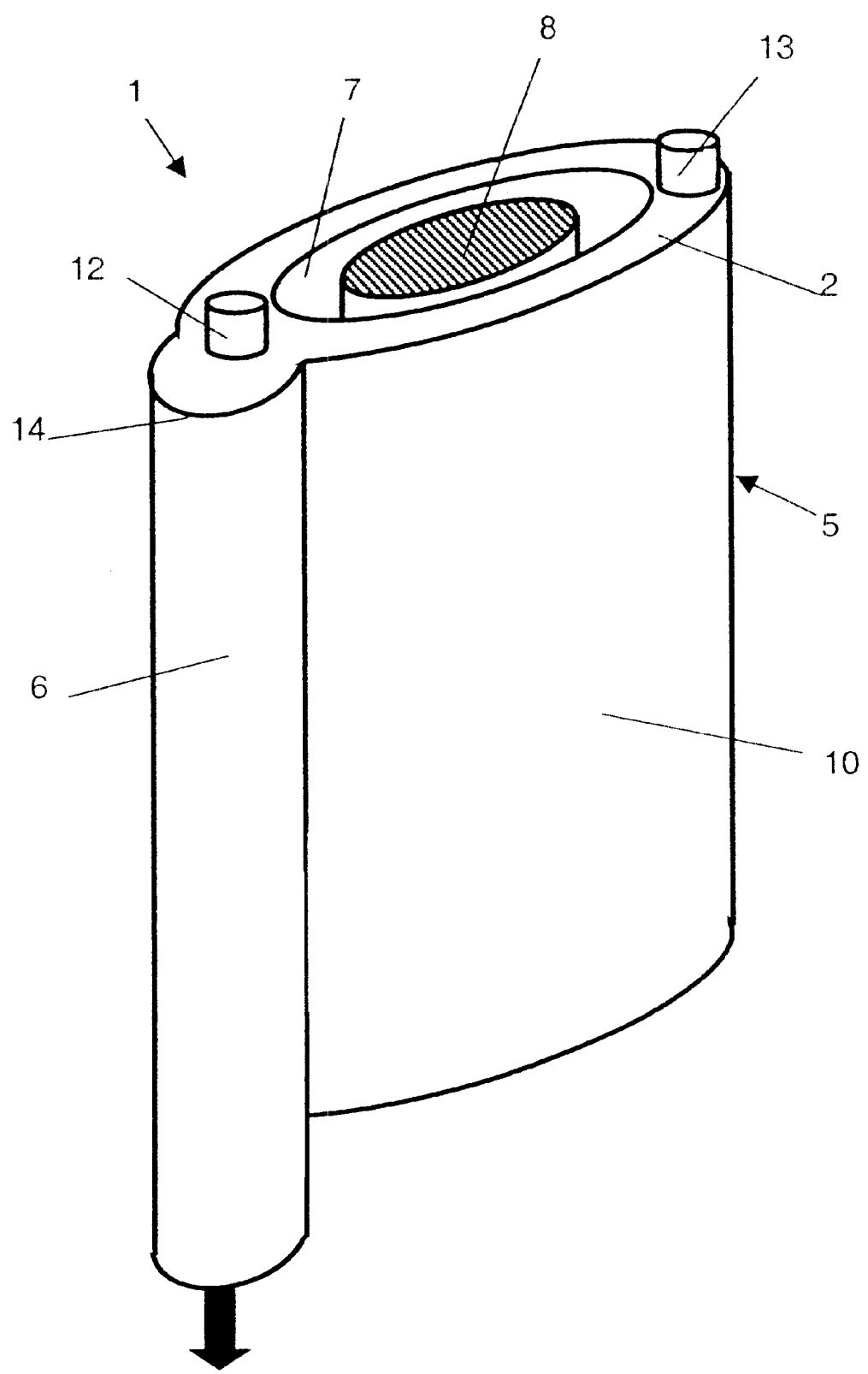
FIG. 4 is a schematic perspective view of the construction of a second embodiment of a combined component but without a housing according to the invention.

The combined component, designated generally by numeral 1 in FIG. 1 and FIG. 4, comprises a heat exchanger 5 and a reactor 8. The heat exchanger 5 surrounds the reactor 8. The heat exchanger 5 has multiplicity of substantially annular plates 2 as seen in FIGS. 2, 3, 5, 6. The plates 2 used can, for example, be cut-out or punched-out plates of circular or other shapes, e.g., elliptic. By stacking the plates, each of the spaces between two adjacent plates 2 form flow spaces for the reactor product and flow spaces for a second medium.

The plate stack can be sealed, for example, by means welding, soldering or using a pressing force. The plate stack is conventionally closed off by two end plates (not shown for better understanding). The heat exchanger has an inner wall 7 that surrounds the reactor 8 and an outer wall 10. The inner wall 7 and outer wall 10 close off the flow spaces of the heat exchanger 5 relative to the surroundings.

FIG. 1 shows a first embodiment of the combined component 1 according to the present invention with a housing 3. The heat exchanger 5 is limited outward by the housing 3 which is shown by dash lines for the sake of clarity. The plates 2 have, over the entire width of the plates 2, a relief slot 4 (FIGS. 2 and 3), for reducing thermomechanical stresses.

The inner wall 7 of the plate stack surrounds the reactor 8. Furthermore, the inner wall 7 of the annular plate stack has supply or inflow orifices 9 as seen in FIG. 2 for the product of the reactor 8. The product enters the heat exchanger 5 through the inflow orifices 9.

Discharge orifices 11 for the product conducted through the flow space are arranged on the outer wall 10 so as to be adjacent to the supply orifices 9 on the inner wall 7 and separated by the relief slot 4. By virtue of the arrangement of the supply orifices 9 and discharge orifices 11, the product completes about one revolution in the flow space from its entry into the flow space until its exit.

The inflow line 12 and the outflow line 13 for the second medium, e.g., air are separated by the relief slot 4 and extend vertically through the plate stack. By virtue of the arrangement of the inflow line 12 and outflow line 13, the second medium completes about one revolution from its entry into the flow space until its exit. The two lines 12, 13 can also be arranged interchanged, so that a co-current or countercurrent heat exchanger can be produced.

FIG. 2 is a schematic sectional view perpendicular to the longitudinal axis of the component 1 shown in FIG. 1, specifically in the region of a flow space for the reactor product. The flow routing of the reactor product within the heat exchanger 5 can be seen in FIG. 2.

The inner wall 7 has a supply orifice 9, through which the product of the reactor 8 enters the flow space. The outer wall 10 has a discharge orifice 11 which is adjacent to the supply orifice 9 and through which the product leaves the flow space. Furthermore, the annular plate 2 has the relief slot 4, with the result that the supply orifices 9 and discharge orifices 11 are spatially separated from one another. The product of the reactor 8 thus flows through the flow space from entry to exit in a virtually complete revolution.

FIG. 3 shows a section perpendicular to the longitudinal axis of the component 1 of FIG. 1, specifically in the region of a flow space between the plates 2 for the second medium, and the flow routing of the second medium in the heat exchanger 5. The inflow line 12 and an outflow line 13 are provided adjacent one another and are separated by a relief slot 4 in the annular plates 2 as above described. The second medium is thereby forced onto a circular path and thus completes about one revolution from entry into the flow space until exit. Here, too, the two lines 12, 13 can be arranged interchanged, so that a co-current or countercurrent heat exchanger can be produced.

Figure 5:
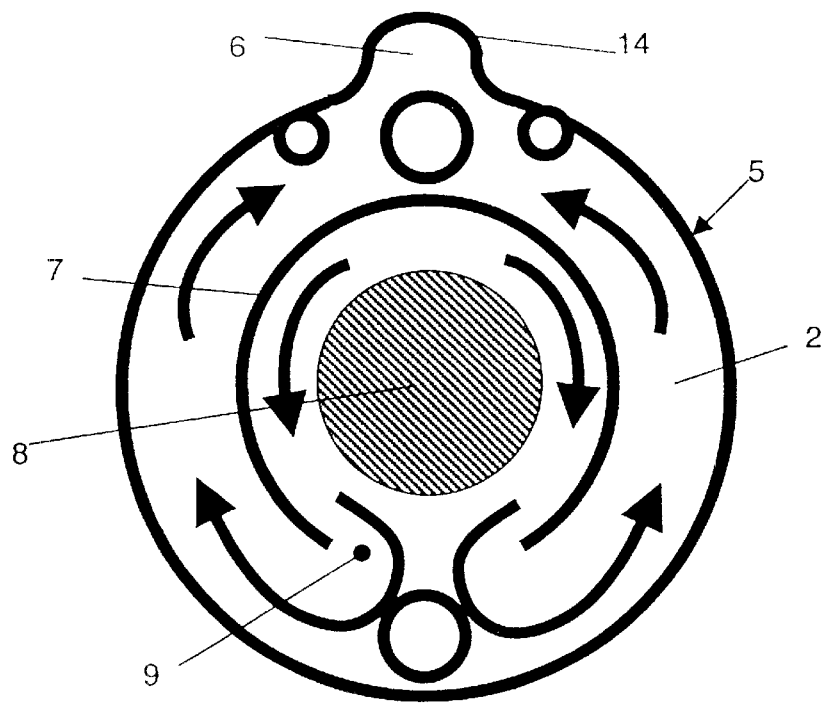
FIG. 5 is a schematic showing the flow routing within the heat exchanger of FIG. 4 for the reactor product.

FIG. 4 shows a further embodiment of a combined component 1 without a housing according to the present invention. The inner wall 7 of the heat exchanger 5 surrounds the reactor 8. Furthermore, as seen in FIG. 5, the inner wall 7 of the heat exchanger 5 has supply orifices 9 for the product of the reactor 8, through which orifices 9 the product enters the heat exchanger 5. The outer wall 10 of the heat exchanger 5 has a protuberance 14 that serves as an outflow line 6 for the product. The inflow line 12 and the outflow line 13 for the second medium are arranged diametrically opposite one another in the plates 2. Here, too, the two lines 12, 13 can be arranged interchanged, so that a co-current or countercurrent heat exchanger can be produced.

FIG. 5 shows a section perpendicular to the longitudinal axis of the component 1 of FIG. 4, specifically in the region of a flow space for the reactor product. The flow profile of the product of the reactor 8 within the heat exchanger 5 can also be seen. The inner wall 7 has a supply orifice 9, through which the product of the reactor 8 can enter the flow space. This supply orifice 9 is advantageously located diametrically opposite the protuberance 14. The protuberance 14 forms the outflow line 6, through which the product is discharged. By virtue of this arrangement, the product completes about half a revolution in the flow space of the heat exchanger 5 from entry to exit. Here, too, the two lines 12, 13 can be arranged interchanged, so that a co-current or countercurrent heat exchanger can be produced.

Figure 6:
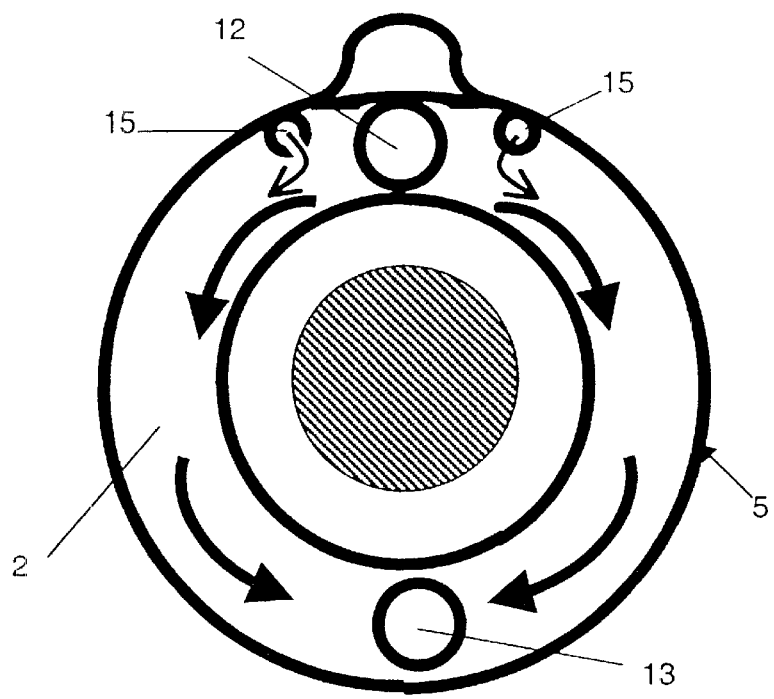
FIG. 6 is a schematic showing the flow routing within the heat exchanger of FIG. 4 for the second medium, with additional inflow lines for the third medium.

FIG. 6 is a sectional view perpendicular to the longitudinal axis of the component 1 of FIG. 4, specifically in the region of a flow space between the plates for the second medium, and shows the flow profile of the second medium in the heat exchanger 5. The inflow line 12 and the outflow line 13 for the second medium are arranged diametrically opposite one another. This ensures that the second medium completes about half a revolution in the heat exchanger 5. Further inflow lines 15 for a third medium are arranged in each case adjacently to the inflow line 12.

During operation, the product of a reactor 8 flows through the corresponding supply orifices 9 on the inner wall 7 of the heat exchanger 5 into the flow spaces. In the flow space, part of the product then flows semicircularly in the clockwise direction and the other part flows semicircularly, counter clockwise, in the direction of the protuberance 14, from where it is discharged through the outflow line 6. The second medium enters the flow space through the inflow line 12 and is divided there into two flow fractions. One part flows clockwise, half a revolution, and the other part flows counter clockwise, half a revolution, in the direction of the outflow line 13. The third medium is introduced into the second medium through further inflow lines 15 which are arranged on both sides of the inflow line 12 for the second medium.

The form of construction illustrated in FIGS. 1 to 6 is merely illustrative. For example a third medium can be introduced into the flow space of the reactor product. Furthermore, the inflow line 12 and the outflow line 13 can be interchanged. In the embodiment of FIGS. 4–6, relief slots 4 can also be provided in the plates 2 to reduce thermomechanical stress.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Combined component comprising:
    a plate type heat exchanger, and a reactor, wherein the heat exchanger is configured with flow spaces for a first medium and a second medium that are present alternately between successive plates of the heat exchanger, and further wherein the plates of the heat exchanger have a substantially annular configuration, and the heat exchanger has, substantially perpendicularly to the plates, a tubular outer wall and a tubular inner wall, the reactor is surrounded by the inner wall of the heat exchanger, whereby a product of the reactor is conductable through supply orifices on the inner wall of the heat exchanger into the flow spaces for one of the two media in the heat exchanger.

2. Combined component according to claim 1, wherein the outer wall of the heat exchanger has orifices for discharging the product of the reactor conducted through the heat exchanger.

3. Combined component according to claim 2, wherein a housing surrounds the heat exchanger.

4. Combined component according to claim 3, wherein the supply orifices and the discharge orifices are arranged adjacent one another, and the supply and discharge orifices are separated from one another by slots in the plates such that the product of the reactor completes about one revolution as it runs through the heat exchanger.

5. Combined component according to claim 4, wherein an outflow line and an outflow line extend substantially perpendicular to the plates for the second medium, and the inflow line and the outflow line are adjacent one another and are separated by slots in the plates such that the second medium completes about one entire revolution when it runs through the heat exchanger.

6. Combined component according to claim 1, wherein the outer wall has a protuberance configured to serve an outflow line for the product.

7. Combined component according to claim 6, wherein the protuberance and the supply orifices for the product of the reactor are located diametrically opposite one another on different sides of the annular plates such that the product completes about half a revolution as it runs through the heat exchanger.

8. Combined component according to claim 7, wherein an inflow line and an outflow line for the second medium are located diametrically opposite one another on different sides of the annular plates such that the second medium completes about half a revolution as it runs through the heat exchanger.

9. Combined component according to claim 8, wherein a further inflow line for a third medium operatively communicates with a flow space for one of the two media or with separate flow spaces for the third medium.

* * * * *